United States Patent
Benner, Jr.

(10) Patent No.: US 6,580,560 B1
(45) Date of Patent: Jun. 17, 2003

(54) LASER LIGHT PROJECTOR HAVING BEAM DIFFUSER AND ASSOCIATED METHODS

(76) Inventor: William R. Benner, Jr., 1536 Cherry Ridge Dr., Heathrow, FL (US) 32746

(*) Notice: Subject to any disclaimer, the term of this patent is extended or adjusted under 35 U.S.C. 154(b) by 0 days.

(21) Appl. No.: 10/061,757

(22) Filed: Feb. 1, 2002

(51) Int. Cl.[7] .............................................. G02B 13/20
(52) U.S. Cl. ..................... 359/599; 359/277; 359/236
(58) Field of Search ................................. 359/599, 227, 359/230, 234, 236, 892, 196, 223, 226; 353/98, 99, 81, 38; 430/363, 395, 397

(56) References Cited

U.S. PATENT DOCUMENTS

| | | | | |
|---|---|---|---|---|
| 3,807,849 A | * | 4/1974 | Lobb | 353/98 |
| 5,125,740 A | * | 6/1992 | Sato et al. | 356/128 |
| 5,695,895 A | * | 12/1997 | Johnson et al. | 430/5 |
| 5,851,740 A | * | 12/1998 | Sawyer | 430/363 |
| 6,061,133 A | * | 5/2000 | Freischlad | 356/460 |

* cited by examiner

*Primary Examiner*—Mohammad Sikder
(74) *Attorney, Agent, or Firm*—Allen, Dyer, Doppelt, Milbrath & Gilchrist, P.A.

(57) ABSTRACT

An apparatus and method for a laser light display projector for projecting a beam of laser light so as to produce a light pattern forming a visually perceptible light image includes a laser light source generating a substantially parallel light beam; a diffuser positioned so that the light beam passes therethrough prior to forming the visually perceptible display, the diffuser having a diffusion pattern effective for diffusing the light beam by a predetermined amount; a rotary actuator bearing the diffuser to thereby impart a rotating motion to the diffuser so that the diffusion pattern rotatably intersects the light beam; and a controller operatively connected to at least the rotary actuator to control rotational positioning of the diffuser in the light beam.

20 Claims, 8 Drawing Sheets

LASER LIGHT PROJECTOR HAVING BEAM DIFFUSER AND ASSOCIATED METHODS

FIELD OF THE INVENTION

The present invention relates to the field of laser light display projectors and, more particularly, to laser projectors used to project graphic images, patterns and arrays of beams, for entertainment display purposes, and capable of producing multiple projection line widths.

BACKGROUND OF THE INVENTION

Laser projectors used in the field of entertainment display applications typically consist of a laser, a light modulator and a deflector. In some cases, laser projectors may also include a fiber optic cable to allow the laser to be located remotely from the other projector elements and in some cases, laser projectors may also incorporate fixed lenses or other devices to focus and shape the projected laser beam. But in almost every case, laser projectors project a fixed beam diameter that in turn produces a fixed spot size on the target medium. For example, the beam diameter on a projection screen might be 1 centimeter, and no matter what image is being projected, the beam diameter remains at 1 centimeter.

Several approaches have been devised to rapidly change the spot size and shape of a projected laser beam. These approaches are described in U.S. Pat. No. 5,274,492 by Mahmoud Razzaghi and in U.S. Pat. No. 5,621,561 by Robert V. Belfatto et al.

In U.S. Pat. No. 5,274,492, Razzaghi describes one embodiment that uses a piezoelectric bimorph to deform a mirror, and another embodiment that uses secondary subscanner. While these approaches seem valid on the surface, there are major obstacles that hinder their implementation.

The use of piezoelectric bimorphs leads to hysteresis in the optical system. If the beam diameter is made large and then small again, there is a residual error caused by the bimorph, which tends to make the beam diameter larger than the input signal would prescribe. Likewise, if the beam is then made large again, the residual error tends to make the beam diameter smaller than the input signal has commanded. To date, only one system, the prototype system, has been manufactured using this method.

In U.S. Pat. No. 5,274,492, Razzaghi describes a second embodiment which includes the use of a subscanner to change the size and shape of the projected laser beam. The use of subscanners can dramatically increase the system cost. What's more, the subscanners have to be extremely fast—capable of scanning in the megahertz range—to prevent the sub-scanned image from actually causing distortion in the main image. Finally, the optical system must be designed very carefully to avoid an effect called optical vignetting. To date, not a single system has been manufactured using this method.

In U.S. Pat. No. 5,621,561, Belfatto et al describes several embodiments that include the use of multiple reflectors, lenses, cubes and other optical elements. In general, all of these embodiments greatly increase system cost and complexity, and due to the relatively large number of optical elements employed, a great deal of time is needed to adjust and align all of these components for proper operation.

There is one thing in common between the one of the approaches taken by Razzaghi and all of the approaches taken by Belfatto et al, and that is the use of optical magnification to change the size and shape of the laser beam. In the case of Razzaghi, optical magnification is produced by changing the shape of a reflective surface. In the case of Belfatto et al, optical magnification is produced by changing the apparent path length between two lenses. Extremely careful alignment is needed in any system which uses optical magnification to change the spot size or shape, to avoid displacing or "scanning" the beam as a result of the magnification. In other words, if the beam does not travel precisely through the center of the optical system, some displacement of the beam will be observed as the system operates.

SUMMARY OF THE INVENTION

With the foregoing in mind, the present invention advantageously provides a laser light beam projector for creating visually perceptible images and capable of changing the shape and size of a light beam so as to alter the image produced. The projector diffuses the laser light beam rapidly, precisely, does so with a minimum of components, and is therefore easily aligned.

The invention discloses a laser light display projector for projecting a beam of laser light so as to produce a light pattern forming a visually perceptible light image. The projector comprises a laser light source generating a substantially parallel light beam; a diffuser positioned so that the light beam passes therethrough prior to forming the visually perceptible display, the diffuser having a diffusion pattern effective for diffusing the light beam by a predetermined amount; a rotary actuator bearing the diffuser to thereby impart a rotating motion to the diffuser so that the diffusion pattern rotatably intersects the light beam; and a controller operatively connected to at least the rotary actuator to control rotational positioning of the diffuser in the light beam. The diffuser may be positioned so that the light beam is incident thereon at a non-perpendicular angle and passes therethrough prior to forming the visually perceptible display, the diffuser having a diffusion pattern effective for diffusing the light beam by a predetermined amount. Additionally, the projector may include at least one reflector positioned adjacent the diffuser to reflect the light beam following a first pass through the diffuser, so as to redirect the light beam toward the diffuser for a second pass therethrough.

A method aspect of the invention includes creating a visual display by diffusing a laser light beam forming a visually perceptible image for a laser light display. The method of the invention comprises energizing a laser light source; generating from the laser light source a laser light beam having substantially parallel light rays; and diffusing the laser light beam prior to forming the visually perceptible image for display by controllably rotating a diffuser intersecting the laser light beam so that the beam passes therethrough, the diffuser having a diffusion pattern effective for diffusing the laser light beam by a predetermined amount responsive to rotation of the diffuser.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

FIGS. 1 through 8 illustrate various aspects of the present invention, which comprises a laser light display projector 10 for projecting a beam of laser light 12 so as to produce a light pattern forming a visually perceptible light image. The projector 10, in a preferred embodiment of the invention, comprises a laser light source 14, a diffuser 18 preferably borne on an actuator, and preferably a rotary actuator 20 as shown in FIGS. 1, 4–5, and 7, and a controller (not shown). The laser light source 14, as known to the skilled, generates the laser light beam, that is, a substantially parallel beam of light. The projector 10 also be connected to a suitable power source 16 to energize the laser light source 14. It should be recognized, however, that the power source 16 may be an external source such as a suitable power outlet. As shown in the embodiment illustrated in FIG. 1, a diffuser 18 is positioned relative to the projector 10 so that the light beam passes therethrough prior to forming the visually perceptible display, the diffuser having a diffusion pattern effective for diffusing the light beam by a predetermined amount. The diffuser 18 is preferably carried on a rotary actuator 20 bearing the diffuser to thereby impart a rotating motion to the diffuser 18 so that the diffusion pattern rotatably intersects the light beam. A controller is operatively connected to at least the rotary actuator 20 to control rotational positioning of the diffuser 18 in the light beam. The controller advantageously may include closed-loop position control of the rotary actuator 20 so as to precisely control rotational positioning of the diffuser 18.

Those skilled in the art will recognize that a projector 10 which permits introducing a predetermined amount of diffusion in a laser light beam for creating a visually perceptible image will allow creation of additional effects employing softer, less defined, and subtler lines, in addition to the sharply defined lines created by the laser light beams of prior art projectors. Not only is the invention useful for controlling the edge sharpness of the lines created by the laser light beam, but the invention also allows for control of the effective beam width through the amount of diffusion imparted to the beam. The present invention, thus, adds previously unachieved versatility to a display laser projector 10.

Figure 1:
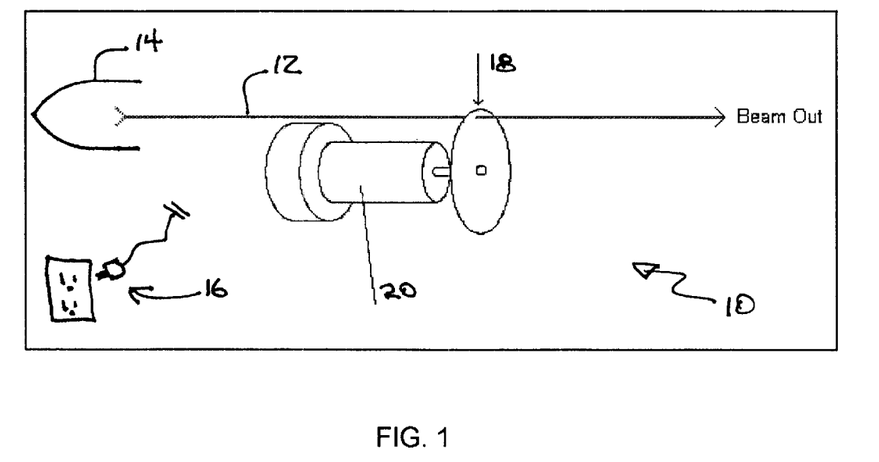
FIG. 1 is a laser light beam projector wherein the light beam is diffused according to an embodiment of the present invention.
Figure 2:
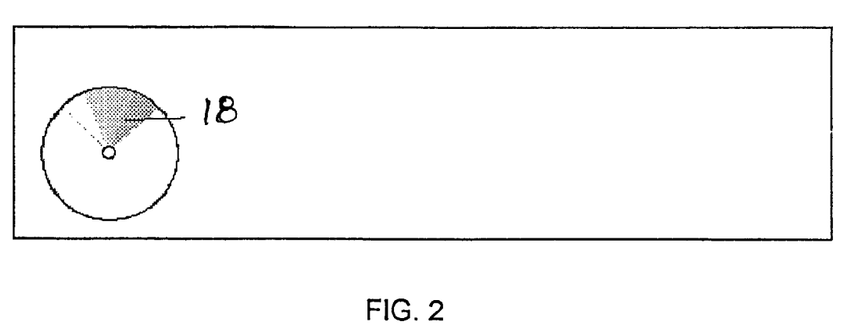
FIG. 2 illustrates a diffuser shaped as a disk, in which the diffusion gradient is shown in discrete sectors.
Figure 3:
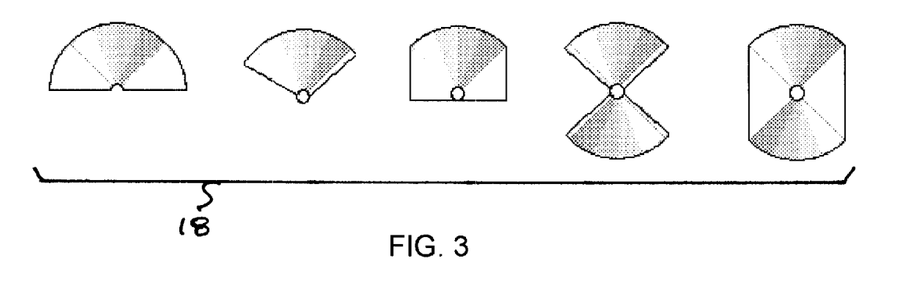
FIG. 3 shows additional embodiments of the diffuser of the present invention.
Figure 6:
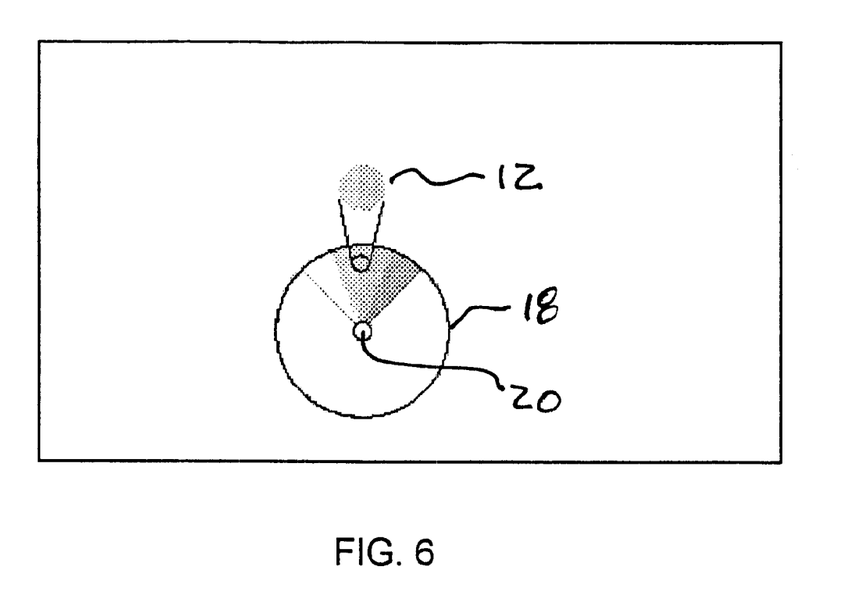
FIG. 6 illustrates how the light beam is diffused as the diffuser rotates intersecting the laser light beam of the present invention.
Figure 8:
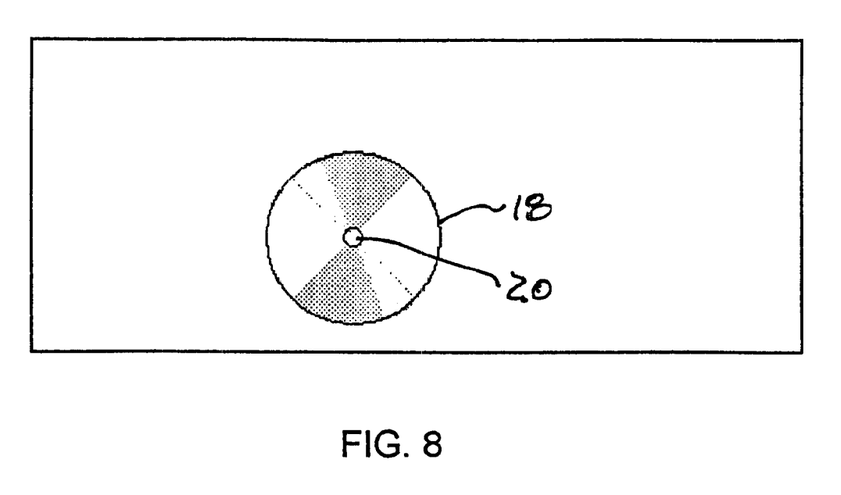
FIG. 8 is a diagram of a diffuser having complementary diffusion gradients positioned generally opposite each other on the diffuser.

Additional preferred embodiments of the invention include other useful features such as wherein the diffuser 18 further comprises a diffusion pattern arranged as a diffusion gradient, as shown in FIGS. 2–3, 6 and 8. In another embodiment the diffuser 18 comprises a substantially transparent material bearing the diffusion pattern, and preferably is shaped as a disk, although other diffuser shapes are also contemplated within the scope of the invention, some of which are illustrated in FIG. 3. The diffuser 18, alternatively designated as a diffusion disk, bears the diffusion pattern, which may be embedded therein, may be disposed along at least one surface of the disk, or may be on both surfaces of the disk. A diffusion disk having the diffusion pattern on a surface could be fabricated, for example, by sandblasting the pattern onto the surface of the disk. Additionally, in another embodiment of the invention the diffuser 18 may preferably comprises a disk having a center and a circumference, and bears a diffusion pattern having a substantially equal density along an imaginary line extending from the center to a point along the circumference, and a substantially greater density along an increasing angle away from the imaginary line. For example, the density gradient may be gradually increased or decreased along the diffuser in either a continuously variable gradient, or a stepped gradient. Further, in such an embodiment the diffuser 18 may comprise a disk having a center and a circumference, and bearing a diffusion pattern having a substantially equal density within at least one discrete sector of the disk having a periphery extending from the center outwardly to two points along the circumference. In such an embodiment the diffusion gradient is said to be "stepped" in discrete sections of the diffuser 18, as shown by way of non-limiting example in FIGS. 2–3, 6 and 8. In a stepped diffusion gradient, each discrete sector of the disk may comprise 90° or less along the circumference of the disk. Furthermore, as seen in FIGS. 2, 6 and 8, the diffusion gradient may be arrayed among a plurality of discrete sectors of the disk, so that each individual sector of the plurality having a substantially equal diffusion pattern density disposed within a periphery extending from the center outwardly to two points along the circumference, the plurality of discrete sectors comprising progressively denser diffusion patterns so as to form the diffusion gradient.

Figure 4:
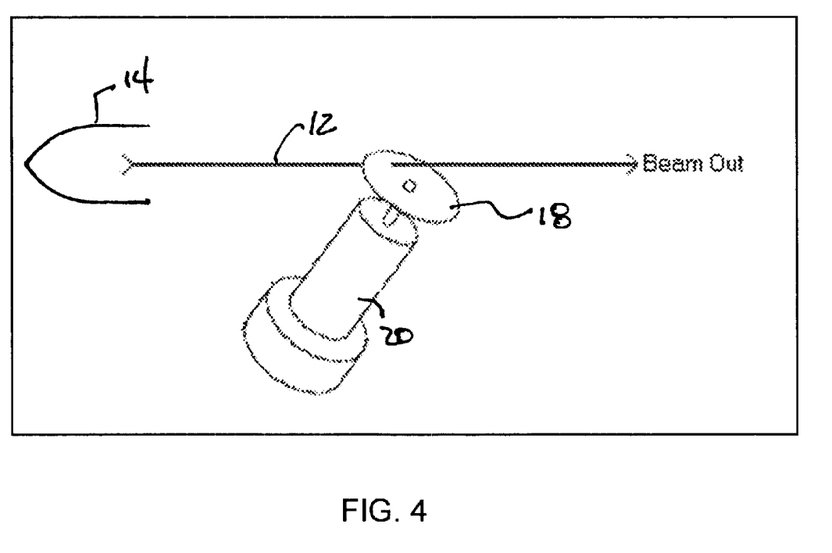
FIG. 4 shows the projector of FIG. 1 wherein the incident angle of the laser light beam to the diffuser is non-perpendicular.
Figure 5:
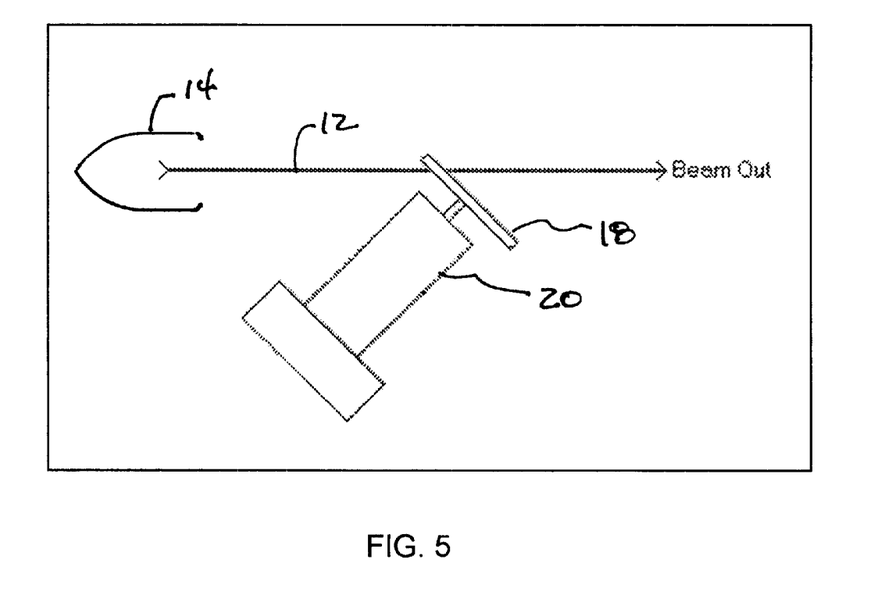
FIG. 5 is a side view of the arrangement shown in FIG. 4.
Figure 7:
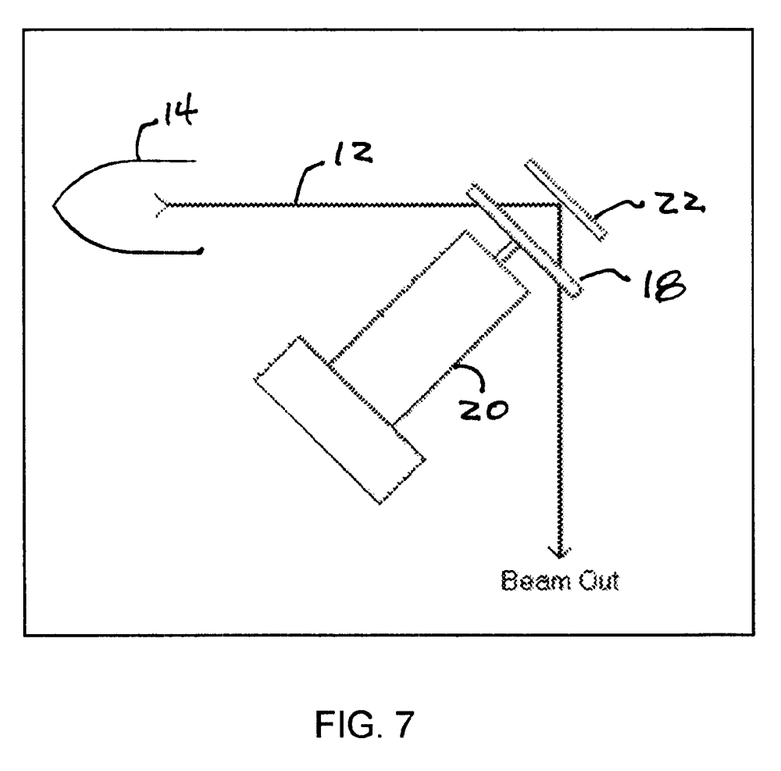
FIG. 7 shows a preferred embodiment of the present invention, wherein the laser light beam twice passes through the diffuser.

In another preferred embodiment of the invention, shown in FIGS. 4, 5 and 7, the diffuser 18 is positioned so that the light beam is incident thereon at a non-perpendicular angle and passes therethrough prior to forming the visually perceptible display, the diffuser having a diffusion pattern effective for diffusing the light beam by a predetermined amount. In this arrangement, a reflector 22 may be positioned adjacent the diffuser 18 to reflect the light beam following a first pass through the diffuser 18, and so as to redirect the light beam toward the diffuser for a second pass therethrough. The angle of incidence for the beam on the diffuser 18 is preferably Brewster's angle which, as known to the skilled, is defined as follows: for light incident on a plane boundary between two regions having different refractive indices, the angle of incidence at which the reflectance is zero for light that has its electric field vector in the plane defined by the direction of propagation and normal to the surface; for propagation from medium 1 to medium 2, Brewster's angle is given as arc tan (n2/n1). This two-pass embodiment of the invention, illustrated in FIG. 7, advantageously helps correct uneven diffusion of a partial cross-section of the laser light beam, which may occur as shown in FIG. 6. These additional aspects of the invention may be combined with the previously described embodiments to provide further advantages. An additional embodiment of the invention includes at least two reflectors to redirect the beam through the diffuser after passing therethrough in a first pass, for example, to allow a two-pass configuration in the projector shown in FIG. 1. The arrangement shown in FIG. 7 is particularly advantageous as it allows for use of a smaller diffuser, or diffuser disk, and also allows for the use of a single reflector. The skilled will understand that a diffuser disk 18 having a smaller diameter also has a smaller mass, which reduces the inertia of the diffuser, easing diffuser positioning by the rotary actuator 20.

Another aspect of the invention includes a method for creating a visual display by diffusing a laser light beam forming a visually perceptible image for a laser light display. The method comprises energizing a laser light source 14; generating from the laser light source 14 a laser light beam having substantially parallel light rays; and diffusing the laser light beam prior to forming the visually perceptible image for display by controllably rotating a diffuser 18 intersecting the laser light beam so that the beam passes therethrough, the diffuser having a diffusion pattern effective for diffusing the laser light beam by a predetermined amount responsive to rotation of the diffuser. By way of non-limiting example, a diffuser disk bearing the diffusion pattern may be rotated to intersect the beam at varying speeds. As can be appreciated by the skilled, the faster the rotation, the greater the amount of diffusion that will be imparted to the beam by the rotating disk.

Additional method aspects of the invention include passing the laser light beam at least twice through the diffuser 18, and particularly passing the laser light beam at least twice wherein the laser light beam is reflected between the first passing and the second passing. As noted above in describing the apparatus of the invention, the method also includes a diffusion pattern arranged as a diffusion gradient. In addition, controllably rotating in the method further comprises closed-loop position control so as to precisely control rotational positioning of the diffuser 18, and diffusing further comprises a substantially transparent material bearing the diffusion pattern. Diffusing may also comprise a disk bearing the diffusion pattern, as previously described for the apparatus, the disk having the diffusion pattern embedded therein. Diffusing in the method also comprises a disk having the diffusion pattern disposed along at least one surface of the disk.

The method further may include a step wherein diffusing comprises a disk having a center and a circumference, and bearing a diffusion pattern having a substantially equal density along an imaginary line extending from the center to a point along the circumference, and a substantially greater density along an increasing angle away from the imaginary line. As in the apparatus, in the method the disk having a center and a circumference, may bear a diffusion pattern having a substantially equal density within at least one discrete sector of the disk having a periphery extending from the center outwardly to two points along the circumference. The discrete sector of the disk may be set out to comprise 90° or less along the circumference of the disk. Finally, in this method aspect of the invention diffusing also comprises a disk having a center and a circumference, and bearing a diffusion gradient arrayed among a plurality of discrete sectors of the disk, each individual sector of the plurality having a substantially equal diffusion pattern density disposed within a periphery extending from the center outwardly to two points along the circumference, the plurality of discrete sectors comprising progressively denser diffusion patterns so as to form the diffusion gradient.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A laser light display projector for projecting a beam of laser light so as to produce a light pattern forming a visually perceptible light image, said projector comprising:

a laser light source generating a substantially parallel light beam;

a substantially planar diffuser positioned so that said light beam is incident thereon at a non-perpendicular angle and passes therethrough prior to forming the visually perceptible light image, said diffuser having a diffusion pattern effective for diffusing said light beam by a predetermined amount; a rotary actuator bearing said diffuser to thereby impart a rotating motion to said diffuser so that said diffusion pattern rotatably intersects said light beam; and a controller operatively connected to at least said rotary actuator to control rotational positioning of said diffuser in said light beam, and comprising closed-loop position control of said rotary actuator so as to precisely control rotational positioning of said diffuser.

2. The projector of claim 1, wherein said diffuser further comprises a diffusion pattern arranged as a diffusion gradient.

3. The projector of claim 1, wherein said diffuser comprises a substantially transparent material bearing said diffusion pattern.

4. The projector of claim 1, wherein said diffuser comprises a disk bearing said diffusion pattern.

5. The projector of claim 1, wherein said diffuser comprises a disk having said diffusion pattern embedded therein.

6. The projector of claim 1, wherein said diffuser comprises a disk having said diffusion pattern disposed along at least one surface of said disk.

7. The projector of claim 1, wherein said diffuser comprises a disk having a center and a circumference, and bearing a diffusion pattern having a substantially equal density along an imaginary line extending from the center to a point along the circumference, and a substantially greater density along an increasing angle away from the imaginary line.

8. The projector of claim 1, wherein said diffuser comprises a disk having a center and a circumference, and bearing a diffusion pattern having a substantially equal density within at least one discrete sector of the disk having a periphery extending from the center outwardly to two points along the circumference.

9. The projector of claim 8, wherein said at least one discrete sector of the disk comprises 90° or less along the circumference of the disk.

10. The projector of claim 1, wherein said diffuser comprises a disk having a center and a circumference, and bearing a diffusion gradient arrayed among a plurality of discrete sectors of the disk, each individual sector of the plurality having a substantially equal diffusion pattern density disposed within a periphery extending from the center outwardly to two points along the circumference, the plurality of discrete sectors comprising progressively denser diffusion patterns so as to form the diffusion gradient.

11. A laser light display projector for projecting a beam of laser light so as to produce a light pattern forming a visually perceptible light image, said projector comprising:

a laser light source generating a substantially parallel light beam;

a substantially planar diffuser positioned so that said light beam is incident thereon at a non-perpendicular angle and passes therethrough at least twice prior to forming the visually perceptible light image, said diffuser having a diffusion pattern effective for diffusing said light beam by a predetermined amount;

at least one reflector positioned adjacent said diffuser to reflect said light beam following a first pass through said diffuser, so as to redirect said light beam toward said diffuser for a second pass therethrough;

a rotary actuator bearing said diffuser to thereby impart a rotating motion to said diffuser so that said diffusion pattern rotatably intersects said light beam; and a controller operatively connected to at least said rotary actuator to control rotational positioning of said diffuser in said light beam, and comprising closed-loop position control of said rotary actuator so as to precisely control rotational positioning of said diffuser.

12. The projector of claim 11, wherein said diffuser further comprises a diffusion pattern arranged as a diffusion gradient.

13. The projector of claim 11, wherein said diffuser comprises a substantially transparent material bearing said diffusion pattern.

14. The projector of claim 11, wherein said diffuser comprises a disk bearing said diffusion pattern.

15. The projector of claim 11, wherein said diffuser comprises a disk having said diffusion pattern embedded therein.

16. The projector of claim 11, wherein said diffuser comprises a disk having said diffusion pattern disposed along at least one surface of said disk.

17. The projector of claim 11, wherein said diffuser comprises a disk having a center and a circumference, and bearing a diffusion pattern having a substantially equal density along an imaginary line extending from the center to a point along the circumference, and a substantially greater density along an increasing angle away from the imaginary line.

18. The projector of claim 11, wherein said diffuser comprises a disk having a center and a circumference, and bearing a diffusion pattern having a substantially equal density within at least one discrete sector of the disk having a periphery extending from the center outwardly to two points along the circumference.

19. The projector of claim 18, wherein said at least one discrete sector of the disk comprises 90° or less along the circumference of the disk.

20. The projector of claim 11, wherein said diffuser comprises a disk having a center and a circumference, and bearing a diffusion gradient arrayed among a plurality of discrete sectors of the disk, each individual sector of the plurality having a substantially equal diffusion pattern density disposed within a periphery extending from the center outwardly to two points along the circumference, the plurality of discrete sectors comprising progressively denser diffusion patterns so as to form the diffusion gradient.

* * * * *